(12) United States Patent
Arnold et al.

(10) Patent No.: US 7,532,123 B2
(45) Date of Patent: May 12, 2009

(54) MAGNETIC TAGGING

(75) Inventors: David Howard Arnold, Weybridge (GB); Robert Julian Dickinson, London (GB)

(73) Assignee: Linksure Ltd., Thrapston, Northamptonshire (GB)

( * ) Notice: Subject to any disclaimer, the term of this patent is extended or adjusted under 35 U.S.C. 154(b) by 194 days.

(21) Appl. No.: 10/575,155

(22) PCT Filed: Sep. 21, 2004

(86) PCT No.: PCT/GB2004/004014

§ 371 (c)(1),
(2), (4) Date: Mar. 16, 2007

(87) PCT Pub. No.: WO2005/040862

PCT Pub. Date: May 6, 2005

(65) Prior Publication Data

US 2007/0268141 A1 Nov. 22, 2007

(30) Foreign Application Priority Data

Oct. 6, 2003 (GB) .................................. 0323349.1

(51) Int. Cl.
G08B 13/14 (2006.01)

(52) U.S. Cl. ................. 340/572.6; 340/551; 340/568.1; 340/572.1; 324/233

(58) Field of Classification Search ................. 340/551, 340/572.6, 540, 541, 568.1, 572.1, 572.5, 340/572.7; 324/233, 222–232, 234–243; 235/449, 450

See application file for complete search history.

(56) References Cited

U.S. PATENT DOCUMENTS

| 4,075,618 | A |   | 2/1978  | Montean |
|-----------|---|---|---------|---------|
| 4,940,966 | A |   | 7/1990  | Davies |
| 5,175,499 | A | * | 12/1992 | Davies ........................ 324/300 |
| 5,420,569 | A |   | 5/1995  | Dames |
| 5,614,824 | A | * | 3/1997  | Dames et al. ................ 324/239 |
| 5,729,201 | A |   | 3/1998  | Schrott |
| 5,965,214 | A |   | 10/1999 | Coggill |
| 5,968,820 | A | * | 10/1999 | Zborowski et al. .......... 435/325 |
| 5,986,926 | A |   | 11/1999 | Ruhrig |
| 6,144,300 | A |   | 11/2000 | Dames |
| 6,204,766 | B1 |  | 3/2001  | Coggill |
| 6,289,141 | B1 | * | 9/2001 | Roseman ..................... 382/320 |
| 6,371,379 | B1 |  | 4/2002  | Dames |
| 7,154,447 | B2 | * | 12/2006 | Copeland et al. ............ 343/788 |

FOREIGN PATENT DOCUMENTS

| EP | 0 096 182 | 12/1983 |
| GB | 2312595 | 10/1997 |

(Continued)

Primary Examiner—Daryl Pope
(74) Attorney, Agent, or Firm—Thomas, Kayden, Horstemeyer and Risley LLP; Todd Deveau

(57) ABSTRACT

Articles are magnetically tagged by a spatial distribution of passive magnetic elements. Each such magnetic element comprises a layer of soft magnetic material characterised by high permeability, low coercivity and a non-linear B-H characteristic, and formed as a discrete region of such material. Each such magnetic element also has at least one second layer of magnetic material capable of being permanently magnetised at least in a region adjacent the first layer to provide a magnetic bias for the magnetic element. The bias of individual such magnetic elements in the spatial distribution and the particular spatial nature of the distribution enables the article to be magnetically encoded.

24 Claims, 6 Drawing Sheets

FOREIGN PATENT DOCUMENTS

| | | |
|---|---|---|
| GB | 2322769 | 2/1998 |
| GB | 2350525 | 11/2000 |
| WO | WO 93/14474 | 7/1993 |
| WO | WO 00/05694 | 2/2000 |
| WO | WO 03/017192 | 2/2003 |

* cited by examiner

MAGNETIC TAGGING

CROSS REFERENCE TO RELATED APPLICATIONS

This application claims priority to and the benefit of the following applications: GB 0323349.1 filed Oct. 6, 2003 and PCT/GB 2004/004014 filed Sep. 21, 2004.

BACKGROUND OF THE INVENTION

This invention relates to magnetic tagging.

More particularly, in different but related aspects thereof, this invention relates to articles comprising magnetic tags, to magnetically tagged articles, to systems comprising such articles and a reading and/or writing assembly therefor, to mating or interlocking first and second parts with means preventing inadvertent re-use of second parts that had been previously used, to methods for encoding a plurality of articles, to methods for correct registration of a first part with a second part, and to methods preventing re-use of a disposable part adapted for mating or interlocking with a second part.

Various non-contact identification systems are currently available. The most extensively used is the optical bar code which has the advantage that the tags can be produced in large quantities at low cost by a printing process. It is easy to copy the tag and once printed the code cannot be altered. As the system is optical there must be line-of-sight between the reader and the tag. Reading, which usually relies on scanning laser beams, is disrupted by dirt or fluid on the tag. The cost and size of the readers makes bar code technology unsuitable for any system seeking to prevent re-use or to registration systems.

Radio Frequency Identification Tags employ electromagnetic radiation to couple the reader to the tag, and so do not rely upon line of sight. The tags use integrated electronic circuits and in some systems, such as those supplied under the "Tag-it" Trademark by Texas Instruments, allow writing as well as reading. A significant drawback to such devices is that they do not tolerate gamma sterilisation, and so this technology would not be suitable for connectors used to supply food and medicinal substances, which often require such sterilisation.

A number of systems employing magnetic materials have also been proposed.

Thus, WO 93/14474 (RSO Corporation NV) describes a system that generates an electromagnetic field, to which individual transponder units including means storing identification data respond to transmit a signal, which is then received by a receiver. The transponders also carry a magnetic element, the properties of which are influenced by an external magnetic field in an interrogation zone, to modify the transponder signal.

U.S. Pat. No. 4,075,618 (Montean et al.) describes an antipilferage magnetic tag detected in an interrogation zone producing an alternating magnetic field by high-order harmonics produced by the presence of the tag. The tag has an asymmetrically shaped piece of low-coercive force ferromagnetic material, including a centre section and flux concentrator sections at opposite ends of this section.

U.S. Pat. No. 6,371,379 (Dames et al.) discloses a magnetic tag having a first region of soft magnetic material with high-permeability, low-coercivity and a non-linear B-H characteristic, and a second adjacent region of permanently magnetisable material having at least three discrete regions of magnetic bias material, in which the discrete regions exhibit different levels and direction of bias. When the tag is interrogated by a constant frequency alternating magnetic field, the magnetic bias levels of these discrete regions are overcome at different times in the interrogation cycle. Because the hard magnetic material saturates the soft magnetic material, it does not generate a harmonic signal until the external alternating field is equal and opposite to the bias of a particular such discrete region. Thus the different bias levels of the discrete regions of hard magnetic material making up the tag enable the tag to be encoded. As a practical matter, such tags are generally limited to between 5 and 10 codes. Because the same alternating field is applied to all the discrete regions at the same time, the individual discrete regions cannot be written to or re-programmed in situ other than by equating all the bias levels to an identical value.

U.S. Pat. No. 6,144,300 (Dames) discloses what in effect is a magnetic analogue of an optical bar code reader system. Soft magnetic elements are arranged in a linear array and read by mechanically scanning a coil along the array, the coil generating a magnetic null enabling the elements of the array to respond to the applied field. The spatial arrangement of the elements in the linear array defines a code similar to a bar code.

SUMMARY OF THE INVENTION

According to a first aspect of the present invention, there is provided a magnetically tagged article, the article bearing a spatial distribution of passive magnetic elements, each such magnetic element comprising a layer of soft magnetic material characterised by high permeability, low coercivity and a non-linear B-H characteristic, and formed as a discrete region of such material, and each such magnetic element having at least one second layer of magnetic material capable of being permanently magnetised at least in a region adjacent said first layer to provide a magnetic bias for the said magnetic element; the bias of individual said magnetic elements in said spatial distribution and the particular spatial nature of the said distribution for the said article enabling the said article to be magnetically encoded.

In a second and alternative aspect of this invention, there is provided an article comprising a magnetic tag or marker adapted to be attached to a selected article to be tagged, and comprising a substrate, preferably flexible, the substrate carrying a spatial distribution of passive magnetic elements, each such magnetic element comprising a layer of soft magnetic material characterised by high permeability, low coercivity and a non-linear B-H characteristic, and formed as a discrete region of such material, and each such magnetic element having associated therewith at least one second layer of magnetic material capable of being permanently magnetised at least in a region adjacent said first layer to provide a magnetic bias for the said magnetic element; the bias of individual said magnetic elements in said spatial distribution and the particular spatial nature of the said distribution for the said tag or marker enabling the article to be tagged to be magnetically encoded.

Preferred embodiments of the invention may include one or more of the following features: The spatial distribution may be in two dimensions. The article may include a curved surface circumextending about an axis, and the magnetic elements may be distributed on the said surface at locations spaced in the circumferential direction relative to the said axis. A single continuous second layer may be common to all of the magnetic elements, the spatial distribution of the discrete regions of the soft magnetic material defining the spatial distribution of the magnetic elements. The continuous second layer may serve as the substrate. Each magnetic element may have at least two said second layers characterised by differing coercivities, whereby said second layers are arranged to provide plural levels of bias to a single said magnetic element. The first layer may have an extrinsic relative permeability greater than $10^3$ and a coercivity of not more than 10 A/m. The first layer may be in the form of a thin film.

The invention also extends to a system comprising at least one article as defined above and a reading assembly therefor, the reading assembly comprising means adapted to apply a magnetic bias signal that varies over time to a said magnetic element and means adapted to detect when the said bias signal approximates the said magnetic bias provided by the second layer, thereby enabling the level of the said magnetic bias to be determined.

In preferred embodiments, the reading assembly may comprise a spatial array of reading sub-assemblies, each such sub-assembly being adapted for localised reading, whereby in reading a said article, each such sub-assembly is arranged to read an associated magnetic element while being substantially insensitive to other magnetic elements of the spatial distribution. The distribution of sub-assemblies in said array may correspond to the said spatial distribution of magnetic elements. Alternatively, the number of sub-assemblies in the array may exceed the number of magnetic elements in the said spatial distribution, whereby in reading a said article, each magnetic element in the spatial distribution is arranged to produce a signal in at least one sub-assembly, so that the reading assembly and the article do not require exact registration with each other.

The invention also extends to a system adapted for registration of a first article with a second article, comprising a system as defined above with a distribution of sub-assemblies in said array that corresponds to the said spatial distribution of magnetic elements, wherein the first article comprises the reading assembly and the second article comprises a said at least one article.

In any of the above systems: The detect means may comprise a loop substantially of figure-of-eight form adapted to detect a signal produced when the variable bias signal approximates the magnetic bias provided by the second layer of a said magnetic element. The magnetic bias signal may vary over time at a low frequency of between 1 and 250 Hz, and an additional high frequency magnetic signal at a frequency of between 1 and 20 kHz may also be imposed by the reading assembly. The reading assembly may apply the magnetic bias signal to magnetic elements in the spatial distribution sequentially. Alternatively, the reading assembly may apply the magnetic bias signal to magnetic elements in the spatial distribution in parallel.

A writing assembly adapted to change the permanent magnetisation of at least one magnetic element of said spatial distribution simultaneously with or after reading of at least one or more magnetic elements in said spatial distribution may also be included in the system, thereby providing an indication, if the article is subsequently read again, that the said article had been previously read.

The invention also extends to apparatus comprising a first part that receives selected second parts in mating or interlocking relation therewith, the apparatus being provided with means preventing inadvertent re-use of second parts previously used, wherein the said means comprises a system as defined above, including both a said reading assembly and a said writing assembly mounted on the first part, and each second part comprises an article as defined above.

In a further alternative aspect of this invention, there is provided a method of encoding a plurality of articles, wherein each such article is provided with a spatial distribution of passive magnetic elements, each such magnetic element comprising a layer of soft magnetic material characterised by high permeability, low coercivity and a non-linear B-H characteristic, and formed as a discrete region of such material, and each such magnetic element having at least one second layer of magnetic material capable of being permanently magnetised at least in a region adjacent said first layer to provide a magnetic bias for the said magnetic element; the spatial distribution of magnetic elements and/or the bias of individual said magnetic elements in said spatial distribution being varied from one said article to another to provide said encoding.

According to a yet further alternative aspect of this invention, there is provided method for correct registration of a first part with a second part; the method comprising: providing the first part with a spatial distribution of passive magnetic elements, each such magnetic element comprising a layer of soft magnetic material characterised by high permeability, low coercivity and a non-linear B-H characteristic, and formed as a discrete region of such material, and each such magnetic element having a second layer of magnetic material capable of being permanently magnetised at least in a region adjacent said first layer to provide a magnetic bias for the said magnetic element; providing the second part with a reading assembly for said magnetic elements, the reading assembly comprising means adapted to apply a magnetic bias signal that varies over time and means adapted to detect when the said bias signal approximates the said magnetic bias provided by the second layer of a said magnetic element, and being provided in the form of a spatial array of reading sub-assemblies, the distribution of sub-assemblies in said array corresponding to the said spatial distribution of magnetic elements, and each such sub-assembly being adapted for localised reading of an associated magnetic element while being substantially insensitive to other magnetic elements of the spatial distribution; and adjusting the position of said first part relative to said second part until each of said sub-assemblies indicates the presence of its associated magnetic element.

The invention provides, in another aspect thereof, a method for preventing re-use of a disposable part adapted for mating or interlocking with a second part, the method comprising providing each of said disposable parts with a spatial distribution of passive magnetic elements, each such magnetic element comprising a layer of soft magnetic material characterised by high permeability, low coercivity and a non-linear B-H characteristic, and formed as a discrete region of such material, and each such magnetic element having at least one second layer of magnetic material capable of being permanently magnetised at least in a region adjacent said first layer to provide a magnetic bias for the said magnetic element; providing the second part with a reading assembly for said magnetic elements, the reading assembly comprising means adapted to apply a magnetic bias signal that varies over time and means adapted to detect when the said bias signal approximates the said magnetic bias provided by the second layer of a said magnetic element, and being provided in the form of a spatial array of reading sub-assemblies, the distribution of sub-assemblies in said array corresponding to the said spatial distribution of magnetic elements, and each such sub-assembly being adapted for localised reading of an associated magnetic element while being substantially insensitive to other magnetic elements of the spatial distribution; and adjusting the position of said first part relative to said second part until each of said sub-assemblies indicates the presence of its associated magnetic element; providing the second part with a writing assembly adapted to change the permanent magnetisation of at least one magnetic element of said spatial distribution simultaneously with or after reading of at least one or more magnetic elements in said spatial distribution, thereby providing an indication, if the second part is subsequently read again, that the said second part had been previously read.

As will become clear from the detailed description hereinbelow, articles and systems in accordance with the various aspects of this invention have a wide variety of applications. These include authentication of the origin of replaceable supplies, confirming correct connection of a material supply, preventing connection errors to a medical delivery system and preventing re-use of single use items. A key feature of tags in accordance with this invention is that they have the ability to be written to even when embodied within an article. This has the significant benefit that units may be coded just prior to use, thus reducing lead times and inventory. Moreover, as explained below, there is effectively no limit to the number of possible codes that can be provided in a practical system.

BRIEF DESCRIPTION OF THE DRAWINGS

The invention is hereinafter more particularly described by reference to the accompanying drawings, in which:—

DESCRIPTION OF PREFERRED EMBODIMENTS

Magnetically tagged articles in accordance with the present invention may be embodied as a magnetic tag or marker as such that may be affixed to or otherwise mounted on or incorporated into another article to be tagged. Alternatively, individual magnetic elements may be affixed to, mounted on or otherwise incorporated in an article to provide a tagged article. In either such case, there will be a spatial distribution of magnetic elements.

Figure 1:
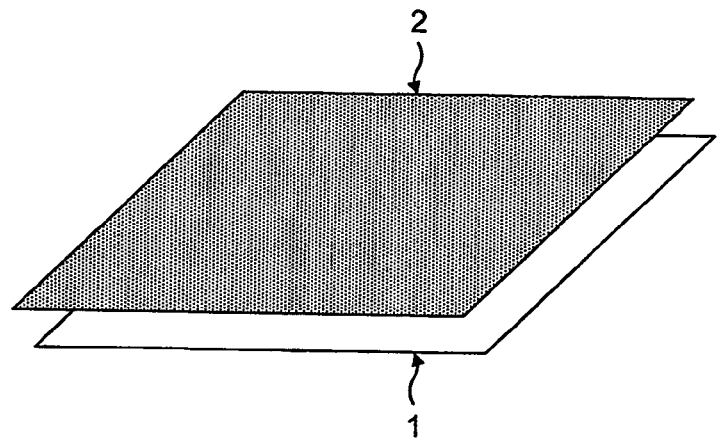
FIG. 1 is a generally schematic perspective view of a single magnetic element.

An explanation of these elements will first be given with reference to FIG. 1 of the accompanying drawings. A typical such a magnetic element will comprise a layer 1 of soft magnetic material, typically a magnetic alloy, characterised by a high permeability, low coercivity and a non-linear B-H characteristic, and formed as a discrete region of such material, combined with one or more layers 2 of a medium to high coercivity ferromagnetic material capable of being permanently magnetised. The first or high permeability magnetic element preferably has an extrinsic relative permeability $>10^3$ and preferably at least $10^4$, and a coercivity <10 Amps/m. This generally requires a material with high intrinsic permeability and low coercivity, in forms such as a long thin strip from which discrete regions may be produced or a thin film that avoid major internal demagnetisation effects. Strip materials are readily-available commercially from suppliers such as Vacuumschmeltze (Germany), Allied-Signal Corp (USA) and Unitika (Japan). Thin film material is currently manufactured in high volume by ISF (Belgium) for use in retail security labels.

The second magnetic material, which functions as a magnetic bias layer, preferably has medium to high coercivity and its nature is less critical; it may, for example, be steel, nickel, ferrite etc. A ferrite-based material such as is commonly used for manufacturing audio and video recording tape is particularly convenient for use with thin film high permeability material, since it can be deposited directly onto the back of the plastic layer supporting the film. This makes for very simple, low-cost manufacture.

An individual magnetic element, as thus described, is broadly similar in construction and materials to certain types of label supplied by Sensormatic (USA), Knogo (USA), 3M (USA) and Checkpoint Meto (Germany) and used in retail security applications in which the medium coercivity layer is magnetised when a product to which the label is applied is sold, rendering the label inactive either by biasing it into saturation, or by magnetically cutting the label into short low-permeability sections, so that it becomes incapable of setting off an alarm that would otherwise be set off by the unaltered label.

Any of the techniques currently employed to produce such security labels may be used to manufacture the above described individual elements from a combination of the first magnetic material that can be supplied initially as a thin foil, wire or film and the second magnetic material. The second magnetic material can produced in a number of formats. It may be coated on to a thin paper or plastic substrate; or it could be coated directly on to the first magnetic material. The first and second magnetic layers may be mounted on to a layer of paper and or plastics material to form a laminate structure. The individual magnetic elements may be secured to an article in a spatial array to serve as an identifying tag for that article, as explained below. Alternatively, a spatial distribution of the elements may be provided on a substrate to form a tag, which may then be to be applied to a selected article to tag it.

Figure 2:
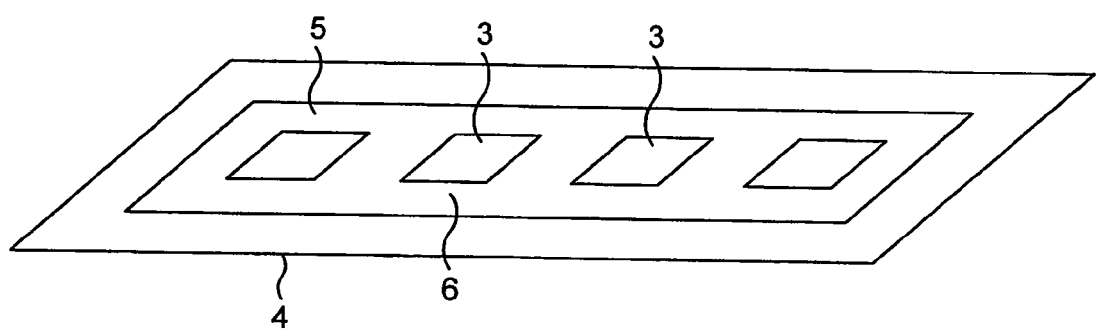
FIG. 2 is a generally schematic perspective view of an article constructed according to the present invention, with a one-dimensional spatial distribution of magnetic elements.

FIG. 2 shows a simple one-dimensional spatial distribution of the magnetic elements described above. Discrete regions of soft magnetic material 3 are mounted on a substrate 4, bonded to a laminate of hard magnetic material 5. The hard magnetic material in this embodiment does not have to be mechanically separated into elements, as the regions 6 adjacent to the discrete regions of soft magnetic material can be locally magnetised.

Figure 3:
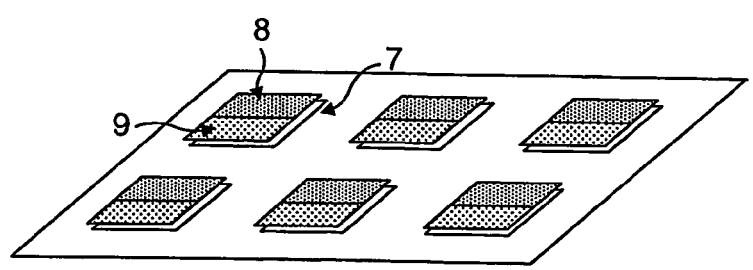
FIG. 3 is a generally schematic perspective view of an article constructed according to the present invention, with a two-dimensional spatial distribution of magnetic elements.

FIG. 3 shows an alternate embodiment in which individual magnetic elements 7 are arranged on a two-dimensional surface. The elements also each have two regions of hard magnetic material 8, 9 with differing coercivities. The surface need not be planar, and can conform to an item on which the illustrated tag is placed.

Figure 4:
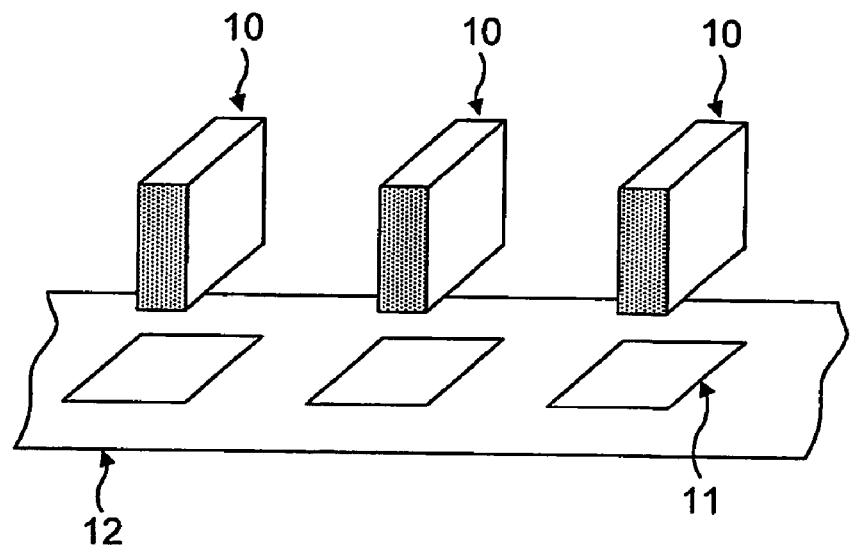
FIG. 4 is a generally schematic perspective view of an embodiment of system in accordance with this invention illustrating the positions of reading sub-assemblies.

FIG. 4 shows an array of individual interrogators 10 serving as reading sub-assemblies of a reading assembly for a tagged article, the interrogators here being are spatially matched to the pattern of individual magnetic elements 11 on the tag 12. As the element and receiver geometries can be closely matched, there are no fundamental constraints on the specific spatial geometries used, so that there is considerable freedom in the way in which individual elements of a tag and associated reading sub-assemblies can be mounted with respect to both regular and irregular articles.

In a basic embodiment, the presence and absence of individual elements will permit the construction of a simple binary code. More codes can be generated by providing the second layer of individual element with a differing levels of bias to saturate the soft magnetic element so that its magnetisation does not generate harmonics when interrogated by an alternating transmit field. If a variable external magnetic bias is then applied, as explained below, using an additional coil system, when the external bias field is equal and opposite to the element bias, then a harmonic signal is generated in response to the alternating transmit field. The combination of different bias levels of each element and the particular spatial distribution of the individual magnetic elements is used to encode a tag.

The number of codes that can be generated by the tags depends on the number of elements, and the number of bias levels, as in Table 1.

TABLE 1

| Number of elements | Number of non-zero bias levels | | | | |
|---|---|---|---|---|---|
| | 0 | 1 | 2 | 3 | 4 |
| 4 | 15 | 80 | 255 | 624 | 1,295 |
| 5 | 31 | 242 | 1,023 | 3,124 | 7,775 |
| 6 | 63 | 728 | 4,095 | 15,624 | 46,655 |
| 7 | 127 | 2,186 | 16,383 | 78,124 | 279,935 |
| 8 | 255 | 6,560 | 65,535 | 390,624 | 1,679,615 |

Use of individual read and write sub-assemblies closely aligned to the individual magnetic elements allows the bias of individual elements to be changed so that the tag can be written to in order to alter its code, while in situ. This can be repeated indefinitely if required. Thus there is a high degree of flexibility in system design and added functionality.

Further benefits are achieved by introducing two or more adjacent layers of hard magnetic material with differing coercivities, e.g. 50, 300 or 3000 oersted, as illustrated in FIG. 3. The use of differing areas of coercivities on each element will enable the writing process to be undertaken more than once. For example this will enable an article to be coded during the production process and then written to when in use. Such functionality could, for example, provide a batch code that could subsequently be written to in order to identify and prevent re-use.

The requirement that the reading sub-assemblies are closely aligned to the individual magnetic elements may in certain circumstances be relaxed, as explained in more detail in a number of embodiments below. In particular, in the case of a tubular connector where the individual magnetic elements are disposed in spaced circumferential relation, and reading sub-assemblies are similarly disposed.

The number of codes in Table 1 will apply in the case where the two are rotationally aligned, for example with a keying arrangement so that the start and end of the tag is clearly identified. If two connectors are not rotationally aligned so the start and end are not defined, then the same arrangement can be used, but the number of codes will be reduced as many codes will be indistinguishable. The codes are then the de Bruin Codes (de Bruijn, N. G. "A Combinatorial Problem." *Koninklijke Nederlandse Akademie v. Wetenschappen* 49, 758-764, 1946) and the number of such codes are given in Table 2. This number of codes will also apply if the tag pattern is repeated several times, and the reader has an arbitrary position relative to the tag elements.

TABLE 2

| | Number of unregistered codes | | |
|---|---|---|---|
| | Number of non-zero bias levels | | |
| Number of Elements | 0 | 2 | 4 |
| 3 | 4 | 24 | 76 |
| 4 | 6 | 70 | 396 |
| 5 | 8 | 208 | 1560 |
| 6 | 14 | 700 | 7826 |
| 7 | 20 | 4000* | 46000* |
| 8 | | | |

*Values are approximate

Even so, it will be seen that the number of possible codes remains substantial with only a few elements and a few available levels of bias.

We shall now explain in more detail how the reading assembly may be constructed and employed in practice.

In preferred embodiments, an individual reading sub-assembly or interrogator suitably comprises (i) first means for generating an alternating magnetic field; (ii) second means for detecting harmonics generated by the interaction between the first magnetic material of the tag and the alternating magnetic field produced in use by said first means; and (iii) third means for altering the external bias field applied to the elements. Fourth means may also be used in some embodiments for applying a large field to an individual element in order to modify the magnetisation of its hard magnetic material.

The first means for generating an alternating magnetic field may do so at a frequency in the range of from 1 to 20 kHz, advantageously in the range from 3 kHz to 10 kHz. The third means for generating a bias is arranged to repetitively sweep the bias magnetic field at a frequency in the range of from 1 Hz to 2000 Hz, preferably 1 Hz to 250 Hz, and advantageously in the range of from 5 Hz to 50 Hz. Preferably the signal generated by the first means is 100 or more times the frequency of the bias generated by the third means.

The first and third means for generating the applied magnetic field may be combined to share components.

Figure 5:
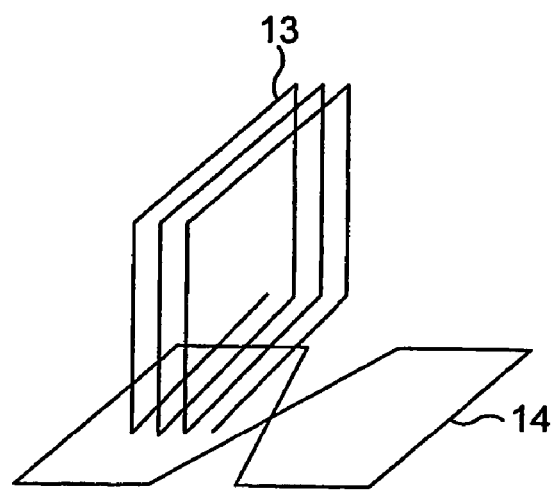
FIG. 5 is a perspective view illustrating an arrangement of coils on a preferred embodiment of reading sub-assembly.

In a preferred embodiment the interrogator consists of coil arrangements. FIG. 5 shows an individual interrogator where the first, third and fourth means are combined and consists of a simple multi-turn loop coil 13. The second means is preferably a planar coil arrangement that has minimal mutual inductance with the first means, this can be achieved using an embodiment comprising of a figure-of-eight arrangement 14 suitably positioned with respect to the first means.

Figure 6:
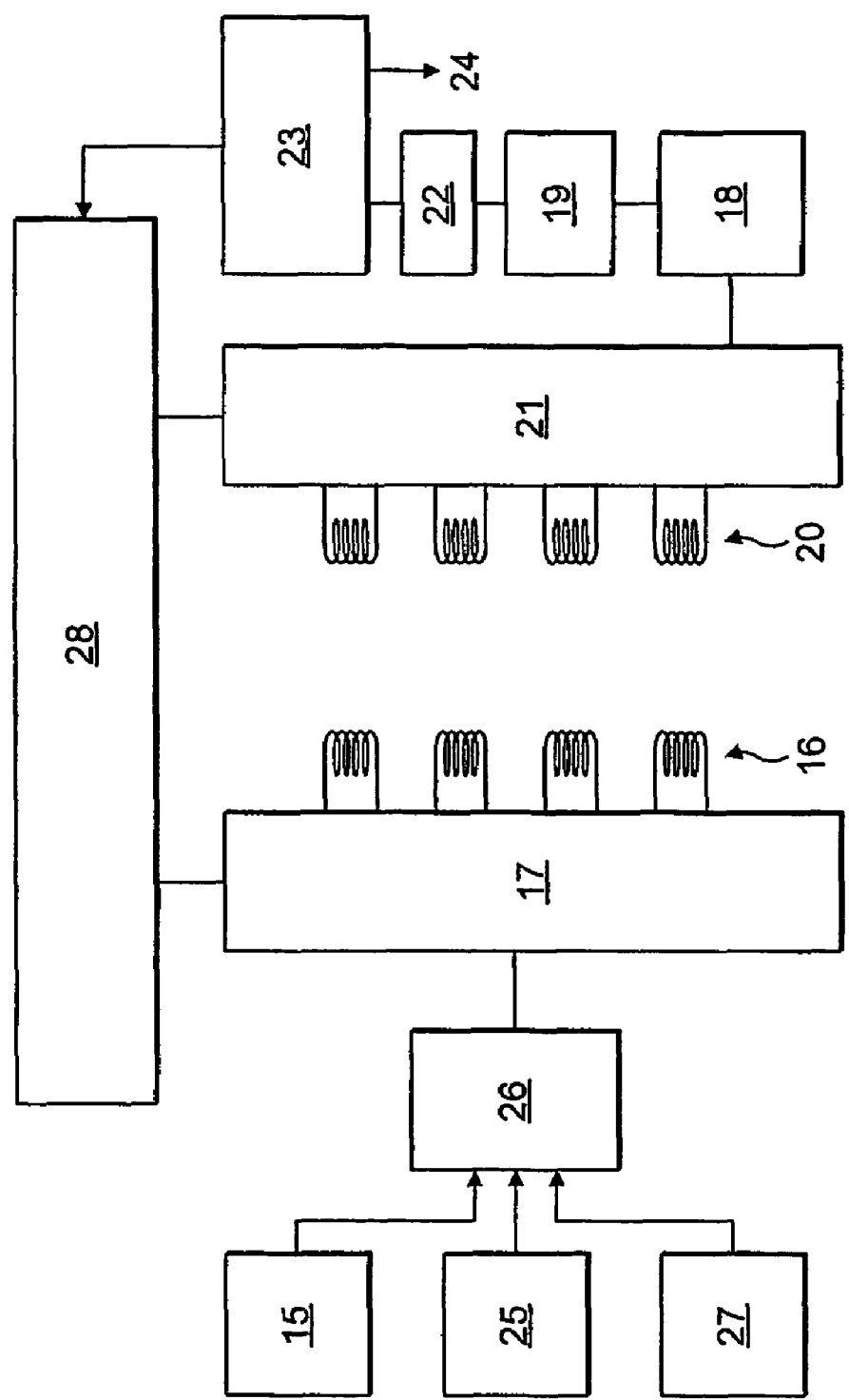
FIG. 6 is a schematic circuit diagram for an embodiment of reading assembly in a system according to the present invention.

A block diagram of an embodiment of signal generation and detection means is shown in FIG. 6. It consists of a generator 15, which produces the transmit signal of the first means. This signal is then switched in turn to each transmit coil 16 of individual reading sub-assemblies via a transmit multiplexer 17. A receive amplifier 18 is arranged to have a narrow band response set at a harmonic of the transmit signal, and to reject the fundamental frequency of the transmit signal. This can be achieved by the incorporation of a narrow band filter 19. Receive amplifier 18 is also connected to respective receive coils 20 of individual reading sub-assemblies in turn via a receive multiplexer 21. The amplified and filtered receive signals are then digitised using an analogue-digital converter 22, and fed to a processor 23 for signal processing and decoding. The decoded identity is presented on an output link 24 in this embodiment for use by equipment into which the reading assembly is embedded. The external bias signal is generated by a separate generator 25, and combined with the transmit signal in a combiner 26, before the composite signal is applied to the transmit coils via the transmit multiplexer 17. A further generator 27 is used to produce writing signals for modifying the bias of an individual magnetic element and is also directed to the transmit coils via the combiner 26. The multiplexers are controlled via a processor controlled controller 28.

Figure 7:
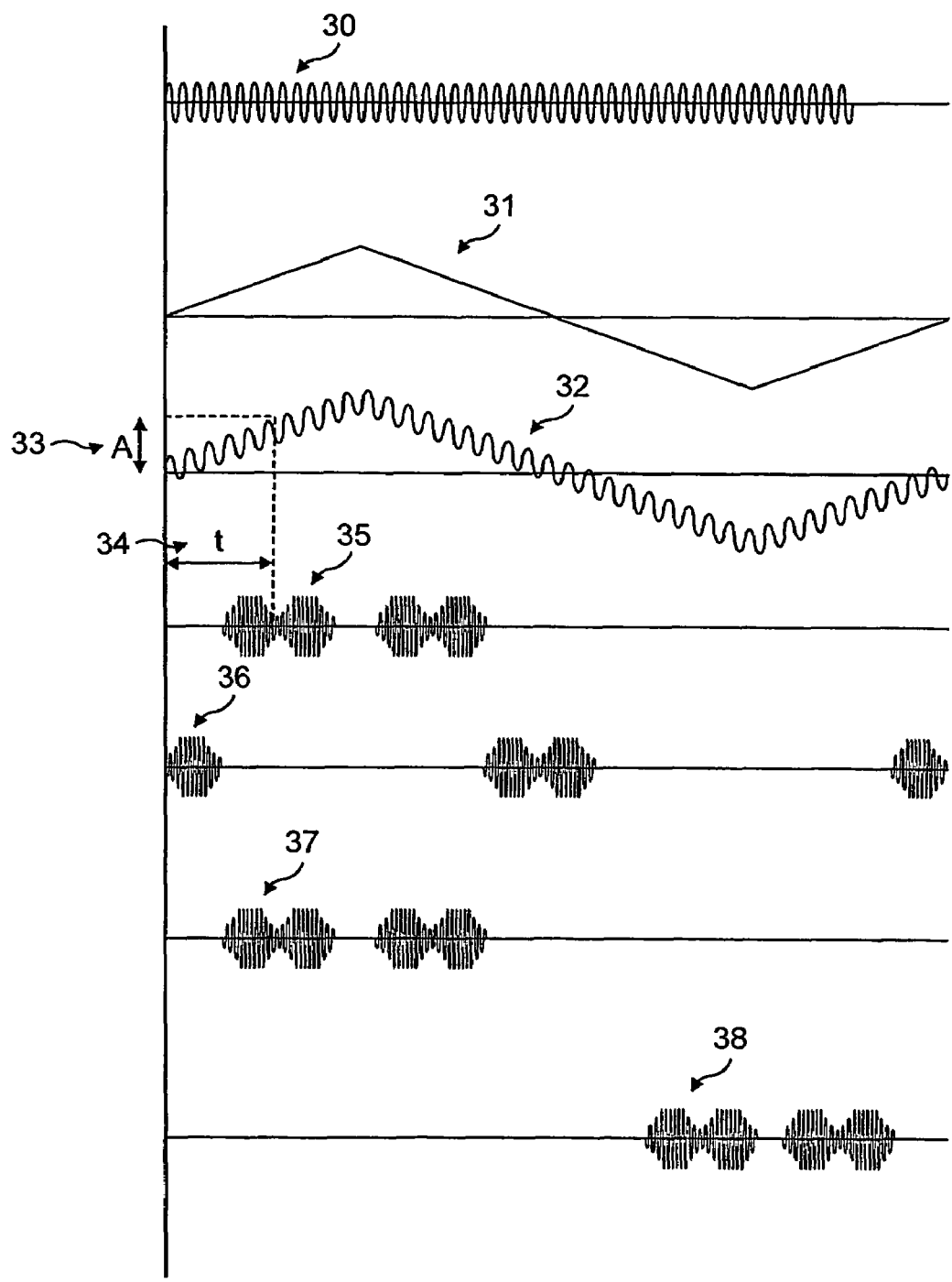
FIG. 7 is an example of waveforms and detected signals.

Typical signals in the system are shown in FIG. 7. As explained above with reference to FIG. 6, a tagged article is preferably interrogated by a high-frequency alternating magnetic field 30 combined with a simultaneously-present low-frequency alternating magnetic field 31 which applies the external bias, the composite signal 32 (FIG. 7) is then applied to the transmit coils. The low frequency field has sufficient amplitude A 33 to overcome the local biasing created by the permanently magnetised layer of each magnetic element. With the bias levels different in different elements, then the bias will be overcome at different points in the low frequency field scan corresponding to different times t 34 in the low frequency waveform.

The high-frequency interrogation field is set to a lower amplitude than the low frequency field, typically less than half. When the local bias has been overcome by the low frequency field, harmonics of the high frequency will be produced by the non-linear B-H characteristic of the high permeability material. These can readily be detected by a suitably-tuned receiver 18, 19. By noting the pattern of harmonic bursts 35 during the low frequency cycle, the particular magnetisation pattern of the individual element is detected. It can be seen from FIG. 7 that two harmonic bursts are obtained per cycle of the low frequency external bias signal, corresponding to each time the external bias equals the element bias. This process is then repeated for each interrogator to give a series of signals. By way of example in FIG. 7, four interrogators giving four signals 35, 36, 37 and 38. From the combination of the presence of an harmonic burst and the position of these bursts from each interrogator the code embodied in the tag is ascertained. In the example shown in FIG. 7, there are three bias levels, positive, no bias and negative bias; the identity of the tag is defined by the code 2, 1, 2, 3 where 0=element absent, 1=no bias, 2=positive bias and 3=negative bias.

Figure 8:
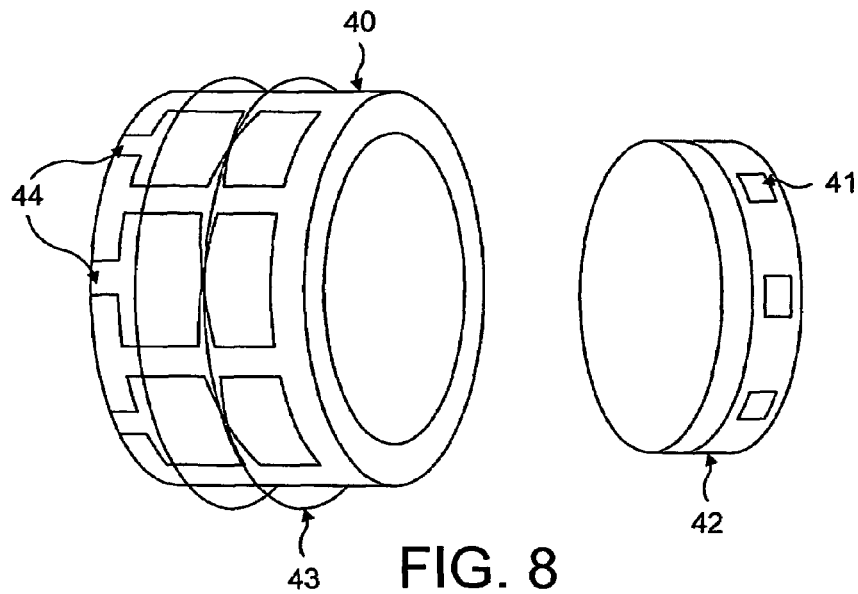
FIG. 8 illustrates how an example of a system in accordance with this invention may be adapted for co-operating connector elements.

In an alternate embodiment, for ease of construction, both the first means for generating the high frequency alternating magnetic field and the third means for generating the low frequency bias are arranged to excite all the individual magnetic elements of the tag and only the individual receivers matched to the spatial pattern of the individual elements. In this case, only one transmit coil is required which provides a magnetic field to all elements simultaneously, and the transmit multiplexer 17 is not required. FIG. 8 shows such an arrangement for a tubular connector, where the reading assembly is mounted on one half of the connector 40 and the individual magnetic elements of a tag 41 are mounted on the mating half of the connector 42. There is only a single transmit coil 43, configured as a solenoid, and common to all the individual reading sub-assemblies, while a plurality of individual receive coils 44 define the array of individual reading sub-assemblies. The coils can be made in one reading assembly by mounting them all on a flexible substrate and wrapping the substrate around the connector.

In a further embodiment the elements are not excited by a high frequency signal, but just by the low frequency bias, so that the signal applied to the transmit coil is represented by 31 in FIG. 7. The low frequency signal may then be between 1 and 2000 Hz, more preferably between 100 Hz and 2000 Hz, and typically around 800 Hz. When the bias field overcomes the bias of an individual magnetic element, a single pulse is obtained, instead of the modulated harmonics 35 of FIG. 7. Although the consequent signal is wider in bandwidth, and has lower signal-noise, there are advantages in not requiring resonant receive coils. The positions of the signals are identical to those shown in FIG. 7.

In a further embodiment, the single transmit coil can also be used to apply a demagnetising signal, which will completely remove or alter the bias of all the individual magnetic elements in the spatial distribution. The resulting tag will still have a code due to the presence and absence of elements, albeit significantly limited in capacity. This feature may be used to alter a tag to identify that a component has been inserted, for example to prevent re-use of single use components, or to disable components that have been inserted into an incorrect receptacle.

Figure 9:
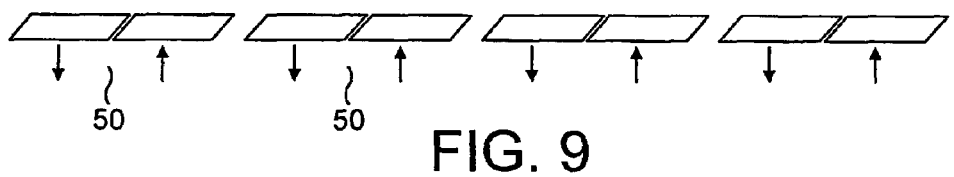
FIG. 9 illustrates how coils of a reading assembly may be arranged for reading registered tags.

FIG. 9 shows in more detail an array of figure-of-eight coil. For each figure-of-eight receive coil 50 the sensitivity is maximum in the centre of the coil pair. The sensitivity profiles do not overlap so that this configuration is suitable for registered tag systems, where the individual magnetic elements of the tag are aligned to the coils of respective reading sub-assemblies, and so will always be positioned at the centre of a coil pair.

Figure 10:
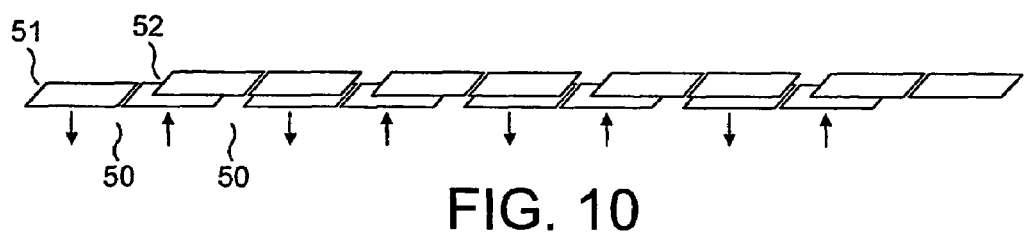
FIG. 10 illustrates an arrangement of interleaved coils in a reading assembly that may be used to read unregistered tags.

With unregistered tags, where the individual elements are not required to be aligned with the coils, a higher density of coils is required. This can be achieved, as shown in FIG. 10, by the use of a second array of coils 52 whose positions are shifted by half a step relative to the first array 51. Thus stepping though the coils gives double the sampling density of the single array in FIG. 9.

Figure 11:
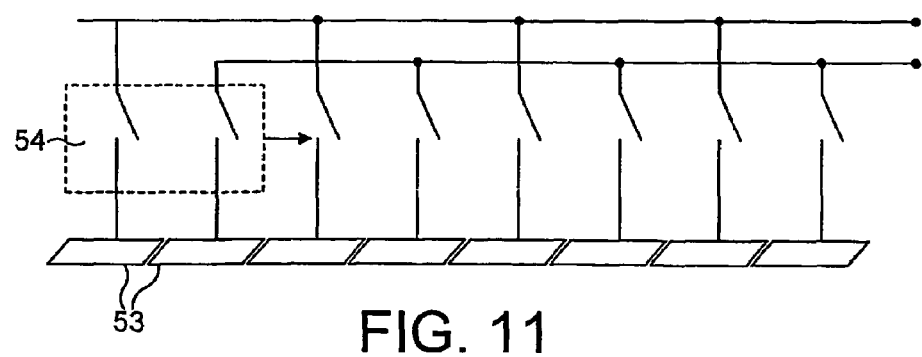
FIG. 11 schematically illustrates a switched array of reading coils in a reading assembly.

A similar line density can be obtained in a further embodiment shown in FIG. 11. Here individual sub-coils 53 of a coil pair are separately connected to a switching arrangement 54. When adjacent sub-coils are connected together a figure-of-eight coil is produced. Moving the pair along one produces another figure-of-eight coil, displaced by half the extent of the figure-of-eight coil. Hence the sampling density is twice that of the arrangement of FIG. 9, and the same as the arrangement in FIG. 10, but with the same number of sub-coils as FIG. 9. The switching arrangement 54 is easily controlled by a shift register.

The higher density arrangements of FIGS. 10 and 11 can also be used for reading a registered tag with a higher density.

The individual magnetic elements making up a spatial distribution will tolerate hostile environments and are compatible with gamma sterilisation.

The arrangements of cooperating magnetic elements in a spatial distribution and array of reading sub-assembly coils enable correct registration between two co-operating mating or interlocking parts to be detected. Equally well, as explained, the described systems can be employed to detect and prevent disposable or replaceable parts being used a further time.

In some applications it is useful to have a "hidden" section of code. For example an original equipment manufacturer may wish to encode a batch code that is not readable by a user. Such an arrangement can be achieved using a spatial distribution for the individual magnetic elements that has two (or more if required) sections. Readers may then be designed to have the capability of reading all or only specifically designated sections of the overall tag.

Figure 12A:
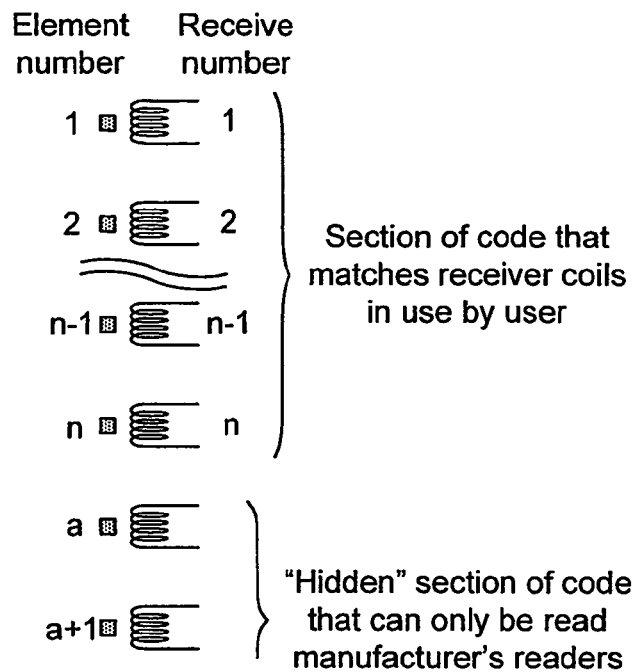
FIGS. 12a and 12b illustrate two alternative arrangements of magnetic elements incorporating hidden sections of code.
Figure 12B:
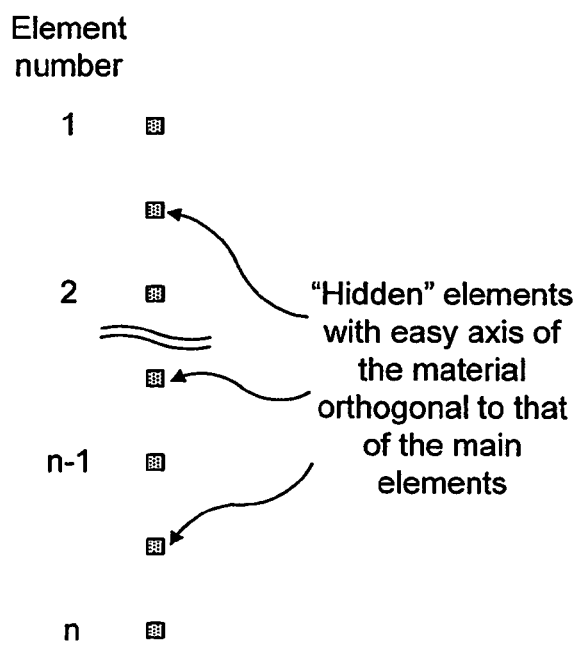

FIG. 12a shows, for example, how a simple linear arrangement of individual elements can be split into sections, one available for the user, the second reserved for the manufacturer. In this arrangement the user would be supplied with a reader with n receivers corresponding to the n user-readable elements of the tag. The tag manufacturer, for example, would also have access to the additional elements i.e. a to a+2. FIG. 12b gives another example, where the two sections are achieved by a spatial distribution of individual elements, where different elements of the distribution have their easy magnetic axis in orthogonal directions. The readers available to the user would may then be enabled only to read elements in the main section of the tag (i.e. elements 1 to n with one magnetic easy axis) while the manufacturer's readers are able to read all the elements or only those (here interleaved with the main elements) with an easy magnetic axis in a direction orthogonal to that of the main elements.

The invention claimed is:

1. A magnetically tagged article, the article bearing a spatial distribution of passive magnetic elements, each such magnetic element comprising a layer of soft magnetic material characterised by high permeability, low coercivity and a non-linear B-H characteristic, and formed as a discrete region of such material, and each such magnetic element having at least one second layer of magnetic material capable of being permanently magnetised at least in a region adjacent said first layer to provide a magnetic bias for the said magnetic element; the bias of individual said magnetic elements in said spatial distribution and the particular spatial nature of the said distribution for the said article enabling the said article to be magnetically encoded.

2. An article comprising a magnetic tag or marker adapted to be attached to a selected article to be tagged, and comprising a substrate, preferably flexible, the substrate carrying a spatial distribution of passive magnetic elements, each such magnetic element comprising a layer of soft magnetic material characterised by high permeability, low coercivity and a non-linear B-H characteristic, and formed as a discrete region of such material, and each such magnetic element having associated therewith at least one second layer of magnetic material capable of being permanently magnetised at least in a region adjacent said first layer to provide a magnetic bias for the said magnetic element; the bias of individual said magnetic elements in said spatial distribution and the particular spatial nature of the said distribution for the said tag or marker enabling the article to be tagged to be magnetically encoded.

3. An article according to any of claim 1 or claim 2, wherein the spatial distribution is in two dimensions.

4. An article according to claim 1, wherein the article includes a curved surface circumextending about an axis, and the magnetic elements are distributed on said surface at locations spaced in the circumferential direction relative to the said axis.

5. An article according to any of any preceding claim, wherein a single continuous second layer is common to all said magnetic elements, the spatial distribution of the discrete regions of said soft magnetic material defining the spatial distribution of said magnetic elements.

6. An article according to both claim 2 and claim 5, wherein said continuous second layer serves as said substrate.

7. An article according to any of any of claims 1 to 4, wherein each said magnetic element has at least two said second layers characterised by differing coercivities, whereby said second layers are arranged to provide plural levels of bias to a single said magnetic element.

8. An article according to any preceding claim, wherein said first layer has an extrinsic relative permeability greater than $10^3$ and a coercivity of not more than 10 A/m.

9. An article according to any of claim 8, wherein the first layer is in the form of a thin film.

10. A system comprising at least one article according to any preceding claim and a reading assembly therefor, the reading assembly comprising means adapted to apply a magnetic bias signal that varies over time to a said magnetic element and means adapted to detect when the said bias signal approximates the said magnetic bias provided by the second layer, thereby enabling the level of the said magnetic bias to be determined.

11. A system according to claim 10, wherein the reading assembly comprises a spatial array of reading sub-assemblies, each such sub-assembly being adapted for localised reading, whereby in reading a said article, each such sub-assembly is arranged to read an associated magnetic element while being substantially insensitive to other magnetic elements of the spatial distribution.

12. A system according to claim 11, wherein the distribution of sub-assemblies in said array corresponds to the said spatial distribution of magnetic elements.

13. A system according to claim 11, wherein the number of sub-assemblies in said array exceeds the number of magnetic elements in said spatial distribution, whereby in reading a said article, each magnetic element in said spatial distribution is arranged to produce a signal in at least one sub-assembly, so that the reading assembly and the article do not require exact registration with each other.

14. A system adapted for registration of a first article with a second article, comprising a system according to claim 12, wherein the first article comprises the reading assembly and the second article comprises a said at least one article.

15. A system according to any of claims 10 to 14, wherein the detect means comprises a loop substantially of figure-of-eight form adapted to detect a signal produced when the variable bias signal approximates the magnetic bias provided by the second layer of a said magnetic element.

16. A system according to any of claims 10 to 15, wherein said magnetic bias signal varies over time at a low frequency of between 1 and 250 Hz, and an additional high frequency magnetic signal at a frequency of between 1 and 20 kHz is also imposed by said reading assembly.

17. A system according to any of claims 10 to 16, wherein said reading assembly is adapted to apply said magnetic bias signal to magnetic elements in said spatial distribution sequentially.

18. A system according to any of claims 10 to 16, wherein said reading assembly is adapted to apply said magnetic bias signal to magnetic elements in said spatial distribution in parallel.

19. A system according to any of claim 12, further comprising a writing assembly adapted to change the permanent magnetisation of at least one magnetic element of said spatial distribution simultaneously with or after reading of at least one or more magnetic elements in said spatial distribution, thereby providing an indication, if the article is subsequently read again, that the said article had been previously read.

20. Apparatus comprising a first part that receives selected second parts in mating or interlocking relation therewith, the apparatus being provided with means preventing inadvertent re-use of second parts previously used, wherein the said means comprises a system according to claim 19, in which the said reading and writing assemblies are mounted on the first part, and each second part comprises an article according to claim 1 or to any of claims 3 to 5 or 9 as appendent to claim 1.

21. Apparatus according to any of claim 20, wherein the first and second parts form a tubular connector and the second part comprises an article according to claim 4.

22. A method of encoding a plurality of articles, wherein each such article is provided with a spatial distribution of passive magnetic elements, each such magnetic element comprising a layer of soft magnetic material characterised by high permeability, low coercivity and a non-linear B-H characteristic, and formed as a discrete region of such material, and each such magnetic element having at least one second layer of magnetic material capable of being permanently magnetised at least in a region adjacent said first layer to provide a magnetic bias for the said magnetic element; the spatial distribution of magnetic elements and/or the bias of individual said magnetic elements in said spatial distribution being varied from one said article to another to provide said encoding.

23. A method for correct registration of a first part with a second part; the method comprising: providing the first part with a spatial distribution of passive magnetic elements, each such magnetic element comprising a layer of soft magnetic material characterised by high permeability, low coercivity and a non-linear B-H characteristic, and formed as a discrete region of such material, and each such magnetic element having a second layer of magnetic material capable of being permanently magnetised at least in a region adjacent said first layer to provide a magnetic bias for the said magnetic element; providing the second part with a reading assembly for said magnetic elements, the reading assembly comprising means adapted to apply a magnetic bias signal that varies over time and means adapted to detect when the said bias signal approximates the said magnetic bias provided by the second layer of a said magnetic element, and being provided in the form of a spatial array of reading sub-assemblies, the distribution of sub-assemblies in said array corresponding to the said spatial distribution of magnetic elements, and each such sub-assembly being adapted for localised reading of an associated magnetic element while being substantially insensitive to other magnetic elements of the spatial distribution; and adjusting the position of said first part relative to said second part until each of said sub-assemblies indicates the presence of its associated magnetic element.

24. A method for preventing re-use of a disposable part adapted for mating or interlocking with a second part, the method comprising providing each of said disposable parts with a spatial distribution of passive magnetic elements, each such magnetic element comprising a layer of soft magnetic material characterised by high permeability, low coercivity and a non-linear B-H characteristic, and formed as a discrete region of such material, and each such magnetic element having at least one second layer of magnetic material capable of being permanently magnetised at least in a region adjacent said first layer to provide a magnetic bias for the said magnetic element, providing the second part with a reading assembly for said magnetic elements, the reading assembly comprising means adapted to apply a magnetic bias signal that varies over time and means adapted to detect when the said bias signal approximates the said magnetic bias provided by the second layer of a said magnetic element, and being provided in the form of a spatial array of reading sub-assemblies, the distribution of sub-assemblies in said array corresponding to the said spatial distribution of magnetic elements, and each such sub-assembly being adapted for localised reading of an associated magnetic element while being substantially insensitive to other magnetic elements of the spatial distribution; and adjusting the position of said first part relative to said second part until each of said sub-assemblies indicates the presence of its associated magnetic element; providing the second part with a writing assembly adapted to change the permanent magnetisation of at least one magnetic element of said spatial distribution simultaneously with or after reading of at least one or more magnetic elements in said spatial distribution, thereby providing an indication, if the second part is subsequently read again, that the said second part had been previously read.

* * * * *